United States Patent
Belmonte et al.

(10) Patent No.: US 8,139,613 B2
(45) Date of Patent: Mar. 20, 2012

(54) METHOD AND DEVICE FOR CHANNEL INSPECTION IN A COMMUNICATION SYSTEM

(75) Inventors: John P. Belmonte, Schaumburg, IL (US); Dipendra M. Chowdhary, Hoffman Estates, IL (US); Yueh Ching Chung, Pul (MY); Hun Weng Khoo, Pul (MY); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 711 days.

(21) Appl. No.: 12/253,380

(22) Filed: Oct. 17, 2008

(65) Prior Publication Data

US 2010/0098049 A1    Apr. 22, 2010

(51) Int. Cl.
*H04J 3/06* (2006.01)
(52) U.S. Cl. .................... 370/503; 370/336; 370/350
(58) Field of Classification Search .................. 370/241, 370/252, 345, 347, 344, 337, 336, 350, 503; 455/435, 422.1, 458, 455, 518
See application file for complete search history.

(56) References Cited

U.S. PATENT DOCUMENTS

| | | | |
|---|---|---|---|
| 3,617,895 A | 11/1971 | Tomsa | |
| 4,573,210 A | 2/1986 | Heck | |
| 4,776,037 A | 10/1988 | Rozanski, Jr. | |
| 5,214,790 A | 5/1993 | Kozlowski et al. | |
| 5,864,752 A * | 1/1999 | Pinder | 455/161.3 |
| 7,369,869 B2 | 5/2008 | Wiatrowski | |
| 2006/0018292 A1 * | 1/2006 | Wiatrowski et al. | 370/337 |
| 2006/0274714 A1 | 12/2006 | Chowdhary | |
| 2007/0254649 A1 | 11/2007 | Klein et al. | |
| 2008/0165759 A1 | 7/2008 | Khoo et al. | |
| 2008/0227412 A1 | 9/2008 | Binowski | |

OTHER PUBLICATIONS

PCT International Search Report Dated May 3, 2010.
PCT International Search Report for U.S. Appl. No. 12/253,391 Dated May 3, 2010.
Office Action for U.S. Appl. No. 12/253,391 Dated Mar. 22, 2010.

* cited by examiner

*Primary Examiner* — Huy Vu
*Assistant Examiner* — Dady Chery
(74) *Attorney, Agent, or Firm* — Valerie M. Davis; Kenneth A. Haas

(57) ABSTRACT

To perform channel inspection, a wireless communication device conducts a full inspection on a first channel carrying a first signal that includes: determining a location of a first synchronization message; and determining whether the first signal is of interest. Upon determining that the first signal is not of interest, the first channel is marked, wherein the marking includes remembering the location of the first synchronization message. The device leaves the first channel and determines an expected location of a second synchronization message on the first channel based on the location of the first synchronization message. Upon returning to the first channel which carries a second signal, the communication device conduct a partial inspection that includes: detecting whether the second synchronization message is present at the expected location, wherein the presence of the second synchronization message indicates that the second signal is not of interest.

13 Claims, 2 Drawing Sheets

METHOD AND DEVICE FOR CHANNEL INSPECTION IN A COMMUNICATION SYSTEM

CROSS-REFERENCE TO RELATED APPLICATIONS

The present application is related to the following U.S. application commonly owned together with this application by Motorola, Inc.:

Ser. No. 12/253,391, filed Oct. 17, 2008, titled "METHOD AND DEVICE FOR CHANNEL INSPECTION IN A COMMUNICATION SYSTEM".

TECHNICAL FIELD

The technical field relates generally to wireless communication systems and more particularly to a method and device for inspecting channels in a wireless communication system.

BACKGROUND

In some communication systems, such as Time Division Multiple Access (TDMA) systems, wireless communication devices operating in these systems are required to monitor multiple channels for radio frequency (RF) activity. For example, a wireless communication device may monitor channels having different priority levels, wherein the device remains on a lower priority channel a majority of the time and periodically leaves the lower priority channel to inspect a higher priority channel for a RF signal of interest. The time that it takes to inspect the higher priority channel and return to the lower priority channel (if no RF signal of interest is present) causes a hole or gap in audio being received on the lower priority channel. The length of that audio hole affects the quality of the audio signal heard by a user of the wireless communication device. Thus, it is desirable to shorten the duration of the channel inspection on the higher priority channel to a minimum amount of time in order to maximize the audio quality of an RF signal on the lower priority channel.

One method used for minimizing the duration of an audio hole is called channel marking, which uses the results from one channel inspection to make assumptions about what to expect during the next channel inspection of the same channel. During the channel marking process, if a channel is not marked, a full inspection is performed to validate whether or not RF activity on the channel is of interest. If the activity is not of interest, the channel is "marked" to cause the communication device to perform only a partial channel inspection upon next returning to the channel. The partial inspection is of a shorter duration, which thereby shortens the duration of the audio hole associated with the partial inspection.

In accordance with one known channel marking technique, during the partial channel inspection, if the communication device finds any RF activity on the channel at all, the communication device assumes that it is the same activity that was present during the full channel inspection. This assumption is valid and the method effective if an idle gap of no RF activity exists between media transmissions on an RF channel that can be used to clear the channel mark, and if only one type of call occurs on the channel. However, this assumption may not be valid in some system implementations, such as in 2-slot TDMA systems, for a number of reasons.

For instance, where multiple media paths (e.g., slots in a TDMA system) exist for a single radio frequency, channels are likely not idle between separate media transmissions because even if one slot is idle, the other slot may be busy, thereby causing the repeater to transmit a signal on that frequency. Thus, a method based on RF energy alone could not differentiate one signal on a slot from a different signal on another slot of the same radio frequency. In addition, where voice, data and control signals appear on the same slot, with data signals filling idle gaps between voice transmissions, wide assumptions based on RF energy alone are ineffective in verifying that the same signal exists on the slot during a subsequent inspection.

Thus, there exists a need for a method for channel inspection that addresses at least some of the above-mentioned shortcomings.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
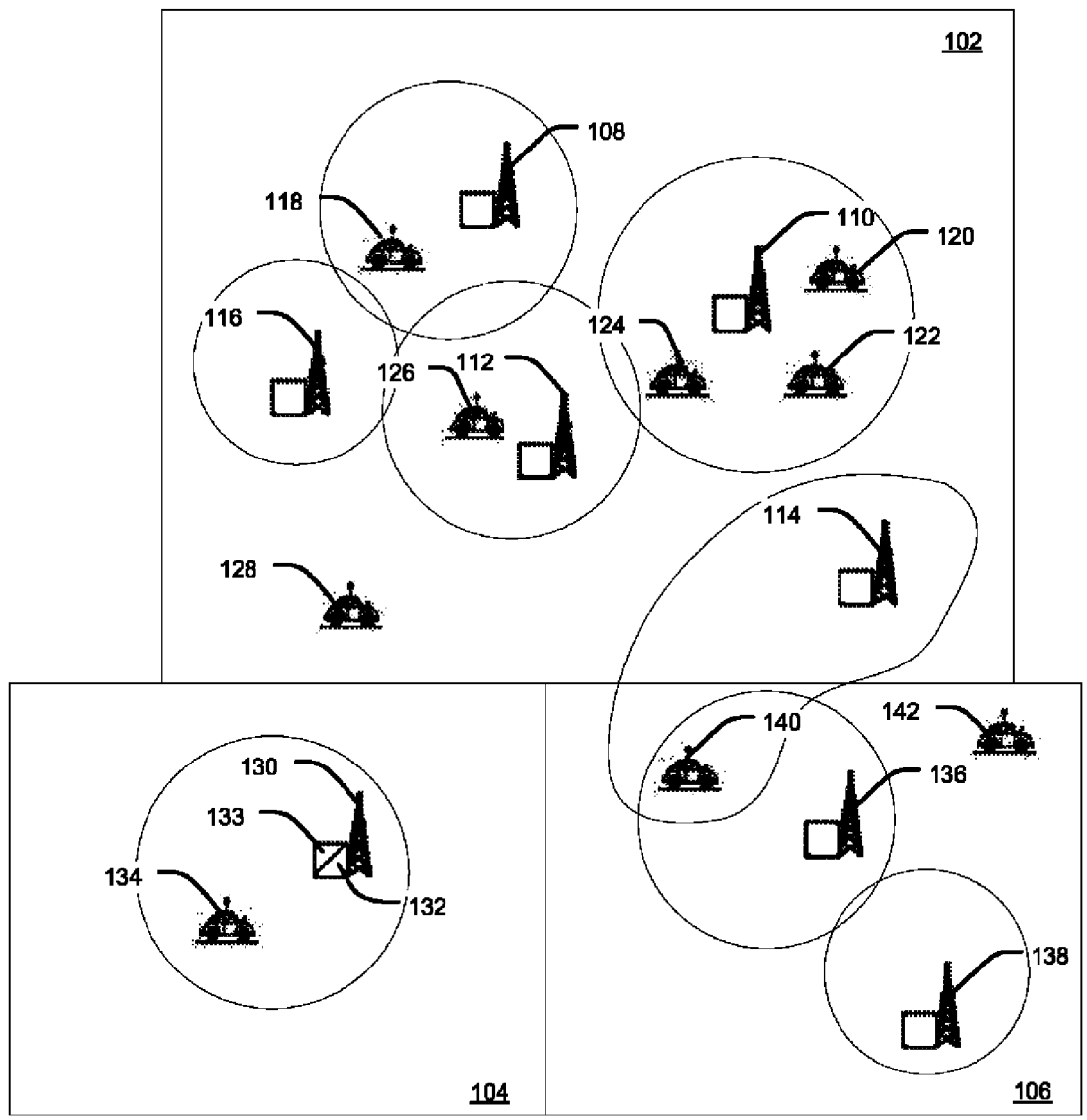
FIG. 1 is a block diagram of a wireless communication network in which may be implemented some illustrative embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, methods for inspecting a wireless communication channel are described with reference to various embodiments. In accordance with a channel inspection method, a wireless communication device conducts a full inspection on a first channel carrying a first signal that includes: determining a location of a first synchronization message; and determining whether the first signal is of interest. Upon determining that the first signal is not of interest, the first channel is marked, wherein the marking includes remembering the location of the first synchronization message. The device leaves the first channel and determines an expected location of a second synchronization message on the first channel based on the location of the first synchronization message. Upon returning to the first channel which carries a second signal, the communication device conducts a partial inspection that includes detecting whether the second synchronization message is present at the expected location, wherein the presence of the second synchronization message indicates that the second signal is not of interest. The communication device may gather additional information during the full inspection such as type of signal, source device type, system identification, data type, etc., to use in qualifying the signal during the partial inspection. This technique provides a more robust channel marking scheme in communication systems, such as TDMA systems, which have different signal types being transmitted on RF channels that have multiple signal paths and where there may be little or no idle time, i.e., little or no period of RF inactivity, between multiple transmissions.

More particularly with respect to TDMA systems, a device gathers information during the long inspection of a high priority channel to determine the expected location of a synchronization message when the device returns to the high priority channel to perform a partial inspection. The device aligns the timing of the partial inspection to coincide with the expected location of the synchronization message in the appropriate slot on the high priority channel to minimize audio holes on a low priority channel that the device is monitoring. During the partial inspection, location of the synchronization message at the expected location indicates that the device is detecting the same signal or call as was detected during the long inspection. The device can also gather additional attributes (parameters) of the signal during the long inspection to more reliably determine if the same call or signal is present on the channel during the partial inspection. Those skilled in the art will realize that the above recognized advantages and other advantages described herein are merely illustrative and are not meant to be a complete rendering of all of the advantages of the various embodiments.

Referring now to the drawings and in particular to FIG. 1, a wireless communication network 100 is depicted in which may be implemented some illustrative embodiments. In this illustrative example, network 100 is a TDMA network in which devices can operate in the network using a Digital Mobile Radio (DMR) air interface standard, which specifies various protocols used by two-way radios (that can both transmit and receive signals) at the data link layer (i.e., layer 2) of the well known seven-layer Open Systems Interconnection computer networking model, and which is described in ETSI TS (Technical Specification) 102 361-1 v1.4.5 (2007-12) published by European Telecommunication Standards Institute (ETSI). Reference herein to the ETSI DMR standard includes the current version of the technical specification and all subsequent and future versions. The ETSI DMR standard specifies a two-slot TDMA structure that transmitting and receiving devices can utilize to send voice and/or data signals. The voice and data signals are transmitted in the TDMA slots in accordance with a general burst format specified in the standard.

Those skilled in the art, however, will recognize and appreciate that the specifics of this example are merely illustrative of some embodiments and that the teachings set forth herein are applicable in a variety of alternative settings. For example, because the teachings described do not depend on the environment, they can be applied to any type of wireless communication network or system that uses periodic synchronization messages and that utilize one or more additional attributes to distinguish transmissions although a DMR network is described. As such, other alternative implementations of using different types of air interface protocols and access technologies are contemplated and are within the scope of the various teachings described including, but not limited to the Project 25 (e.g., Phase I and Phase II) suite of protocols published by APCO (Association of Public-Safety Communication Officials), the TETRA (Terrestrial Trunked Radio) set of standards developed by ETSI (European Telecommunications Standardization Institute), Frequency Division Multiple Access (FDMA) systems, Code Division Multiple Access (CDMA) systems, etc. Moreover, although the embodiments describe a two-slot TDMA structure, any slotting structure can be used.

Referring again to FIG. 1, network 100 includes a system 102, a system 104, and a system 106. System 102 comprises infrastructure devices 108, 110, 112, 114 and 116. System 104 comprises an infrastructure device 130. System 106 comprises infrastructure devices 136 and 138. Each of the infrastructure devices manages two channels or timeslots (e.g., timeslots 132 and 133 shown managed by infrastructure device 130) within a coverage area or cell as indicated by the lined area enclosing the infrastructure device, wherein some infrastructure devices have partially overlapping coverage areas. Several wireless communication devices 118, 120, 122, 124, 126, 128, 134, 140, 142 operate within network 100 to communicate with each other and/or the infrastructure devices.

Each infrastructure device and wireless communication device is at least equipped with a transceiver (i.e., transmitter and receiver apparatus), a memory and a processing device and is further equipped with any additional components as needed for a commercial embodiment. The transceiver, memory and processing device can have any suitable physical implementation and are topologically coupled depending on the particular device implementation. These components are further operatively coupled and can be adapted, arranged, configured, and designed to perform methods in accordance with the teachings herein, for example, as illustratively described by reference to FIG. 2.

As referred to herein, a wireless communication device includes, but is not limited to, devices commonly referred to as access terminals, mobile radios, mobile stations, subscriber units, user equipment, mobile devices, or any other device capable of operating in a wireless environment, and are referred to hereinafter simply as radios. Examples of wireless communication devices include, but are not limited to, two-way radios, mobile phones, cellular phones, Personal Digital Assistants (PDAs), laptops and two-way pagers.

As used herein, an infrastructure device is a device that is a part of a fixed network infrastructure and can receive information (either control or media, e.g., data, voice (audio), video, etc.) in a signal from a wireless communication device and transmit information in signals to one or more wireless communication devices via a communication link. The infrastructure devices can be coupled together via wired links (not shown) and can be coupled via various other network elements such as base station controllers (also not shown), or they may be standalone devices operating independently. Thus, the use of the term "network" does not imply any connectivity between the infrastructure devices. An infrastructure device includes, but is not limited to, equipment commonly referred to as repeaters, base radios, base stations, base transceiver stations, access points, routers or any other type of infrastructure equipment interfacing a wireless communication device in a wireless environment, and is referred to hereinafter simply as a repeater.

In this illustrative embodiment, the radios can communicate in "direct mode" or "talkaround mode", wherein the radios communicate directly with each other outside the control of a repeater. Radios can also communicate in "repeater mode", wherein the radios communicate through a repeater. Transmissions from a repeater to a radio in repeater mode are called outbound transmissions, and transmissions from a radio to a repeater in repeater mode are called inbound transmissions.

As mentioned earlier, the devices in network 100 communicate using communication links (also referred to herein as channels). The channels comprise physical channels and logical channels. The physical channels are the physical communication resources over which information is sent between the elements within network 100. The physical channels can comprise wired links or wireless links. If the physical channels comprise wireless links, the corresponding physical resource is an allocation of radio spectrum that is partitioned into radio frequency (RF) carriers. For TDMA, each RF carrier is partitioned in time into frames and timeslots or simply slots. The timeslots for the TDMA physical channels are labeled channel "1" and channel "2". Thus, each repeater is associated with two logical channels or slots at a single radio frequency. A physical channel is required to support a logical channel, which is a logical communication pathway between two or more parties. Logical channels are separated into two categories: traffic channels carrying speech or data information; and control channels carrying signaling, which is specifically concerned with the establishment and control of connections, and with the management of the physical channels in the network 100.

In an illustrative embodiment, a radio determines timeslot numbering by decoding a TDMA channel field in a Common Announcement Channel (CACH). The CACH is used to identify timeslots 1 and 2 and indicate the status of the timeslots, for instance, whether the timeslots are busy or idle. In the illustrative embodiment of a two-slot TDMA system, the CACH burst is common to timeslot 1 and timeslot 2. As used herein, the terms signal, communication and transmission are used interchangeably and refer to contiguous transmissions from one device on one channel. As it relates to TDMA, the terms signal, communication and transmission refer to TDMA bursts emanating from one device in one timeslot. As such, transmissions may generically refer to voice, data, or control information relating to network 100. The term call refers to related voice transmissions between radios in network 100.

A burst is a period of RF carrier that is modulated by a media stream and represents the physical channel of a single timeslot. The burst is the smallest standalone unit of TDMA transmission. In an illustrative embodiment, a burst comprises 216 bits of payload and 48 bits of synchronization or embedded signaling. The defined burst takes 27.5 ms to transmit and may be followed by 2.5 ms of guard time or a CACH. Thus a burst is 30 ms, and a frame is two contiguous bursts in timeslots labeled 1 and 2 and is 60 ms.

In the wireless communication system 100, the various channels can be associated with different priority levels that may be assigned based upon some communications being perceived as more important than other communications for various reasons. For example, channels carrying emergency transmissions and/or transmissions from a supervisor may be assigned a higher priority than other transmissions in the network. Accordingly, a radio may be required to monitor channels having different priority levels in which one or more channels are designated as "low" or "lower" priority channels and some channels are designated as "high" or "higher" priority channels.

Figure 2:
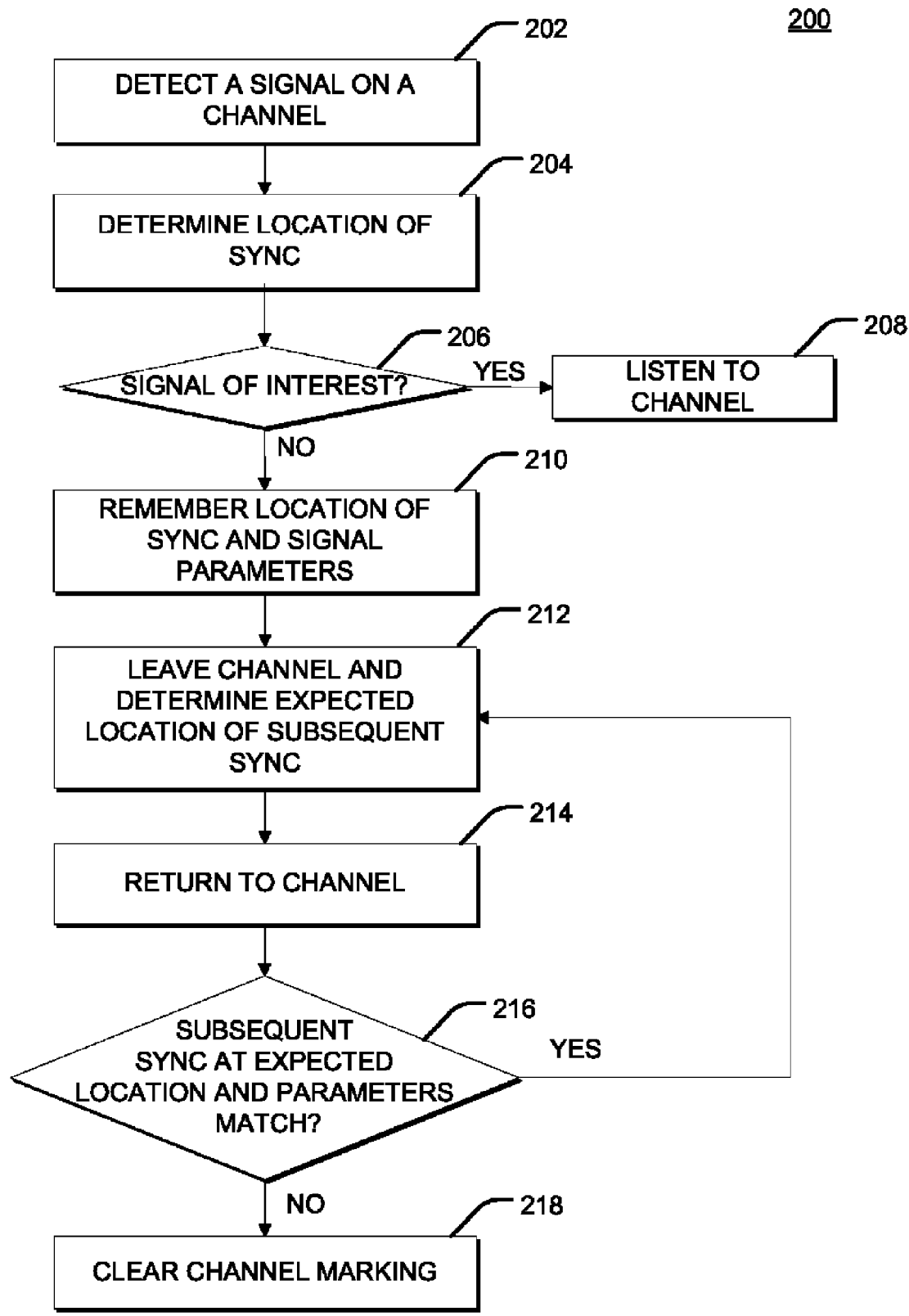
FIG. 2 is a flow diagram of a method for channel inspection in accordance with an illustrative embodiment.

FIG. 2 is a flow diagram of a method 200 for channel inspection in accordance with an illustrative embodiment that allows a device to monitor multiple channels for RF activity including, but not limited to, channels associated with differing priority levels. Referring momentarily again to FIG. 1, radio 140 is within the coverage area of both repeaters 114 and 136 and may be monitoring channels in both coverage areas. In one illustrative implementation, radio 140 is monitoring two channels, a high priority channel (say a channel associated with repeater 136) and a low priority channel (say a channel associated with repeater 114). However, in other embodiments, a radio may be monitoring more than two channels, with some of the channels associated with the same repeater, e.g., alternate slots on the same radio frequency and/or with some channels having the same or no priority assignments.

In accordance with method 200, the radio 140 detects (202) a signal transmitted by repeater 136 on a channel (e.g., the high priority channel) and performs a full inspection on the channel. Signal detection is performed in the radio transceiver using any known technique. Full inspection refers to a process of identifying information on the channel to fully qualify whether the signal on the channel is or is not of interest. At a minimum during the full inspection, the radio 140 determines (204) the location of a synchronization message (SYNC) in the signal. Location for purposes of the description herein includes a temporal location that can be determined any number of ways including, but not limited to, a timestamp, a location in a single or a sequence of transmission units, counting of bits, counting of symbols, counting of bursts, counting of superframes, etc. The format of the SYNC can vary and can depend, for example, on a protocol (either standard, e.g., the DMR standard, or proprietary) in accordance with which the radio is operating.

It should be noted that location might be viewed slightly differently depending on whether embodiments are implemented in a TDMA system, a CDMA system or an FDMA system. More particularly, in an FDMA system, the time is when to find SYNC on the FDMA channel. In a TDMA system, the time actually indicates two things: when to find the logic channel of interest and when to find SYNC within the logical channel. Because it is a TDMA channel, if one knows the latter, then the former is also known, but if only the former is known, then the latter is not necessarily known. In a CDMA system, time might mean when to find SYNC on the channel specified by a particular spreading code (SYNC on channels specified by multiple spreading codes could actually exist at the same time, unlike TDMA where there is a slight offset in time and unlike FDMA where there is only one channel to be concerned with).

In other embodiments, the radio might determine other parameters to qualify the signal such as a type of signal, source device type, system identification, call addressing (which for a voice call takes a full DMR voice superframe of 360 ms to obtain), whether the signal is an emergency signal, priority level, whether the signal is OVCM (open voice call mode), to name a few. Where the radio is operating in a DMR system, for example, the SYNC is included in a 48 bit field (24 symbols) in the center of some TDMA bursts. The SYNC is provided by a special sequence of bits (or symbols) that mark the location of the center of the TDMA burst so that a radio can synchronize to the channel. Once the radio is synchronized, it can use pattern matching to determine the type of SYNC to identify the contents of the burst. Multiple SYNC patterns are used to differentiate voice bursts from data/control bursts (i.e., type of signal), differentiate inbound channels from outbound channels, and identify the source device type. For example, four different SYNCs are used in the DMR standard to indicate repeater sourced voice, repeater sourced data, radio sourced voice, and radio sourced data, and each SYNC is 5 ms long.

As mentioned above, upon locating the SYNC, the radio 140 can identify other parameters of the signal during the full inspection. One such parameter is a system identification that enables the radio to detect which repeater is sending the signal. An example of a system identification is a color code (e.g., as identified in the DMR standard). Another parameter that the radio can identify from a data signal once SYNC is located is a data type, which indicates the type of data being carried in the signal. For instance, the DMR standard sets forth several different data types including Privacy Indicator (PI) Header, Voice Link Control (LC) Header, Terminator with LC, CSBK, MBC Header, MBC Continuation, Data Header, Rate ½ data, Rate ¾ data, Idle, Rate 1 data.

Based on one or more of these signal parameters, radio 140 determines (206) whether the signal on the channel is of interest. For example, if the radio 140 identifies an unexpected color code, the radio will know that the signal is not meant for this radio and is, therefore, not of interest. In addition, based on the addressing identified in the signal (e.g., in the LC of a number of bursts) the radio can identify a signal that is not addressed to the radio or to a group to which the radio is a member and is, therefore, not of interest. Thus through the full inspection, as demonstrated, the radio can gather whatever information is needed to qualify a signal as being of interest or not of interest. However, a shortcoming of the long inspection is the amount of time that it takes and its corresponding effect on the audio quality heard on the lower priority channel. For example, in some TDMA systems, it may take up to 400 ms to find SYNC, plus 150 ms to validate and transit to the desired slot, plus an additional 360 ms to find the voice framing structure and validate the signal. Thus, in a worst case scenario, at least 15 voice bursts (each holding 60 ms of voice) could be missed on the lower priority channel, thereby having a noticeable impact on the audio quality.

If the radio 140 determines (206), that the signal is of interest, it continues to listen (208) to the signal on the channel (which can be carrying voice bursts of a particular call of interest to a user of the radio 140) as long as the radio is able to detect the signal and, usually, until the termination of the call. If the radio 140 determines (206) that the signal is not of interest, it marks the channel so that the radio performs only a partial inspection the next time that it returns to the channel. This channel marking, at a minimum, includes remembering (210) the determined location of the SYNC, for instance by storing the indication of the SYNC location in the radio's memory or starting a timer to indicate a point of time associated with the SYNC. The radio may also remember the state of the channel marking, for instance by storing an indicator as to whether the channel marking is "TRUE" (which would tell the radio to perform a partial inspection on the high priority channel) or "FALSE".

For a more robust channel marking scheme and partial inspection, the radio 140 can further remember (210), or store in its memory, for instance, a first set of parameters associated with the signal to aid the radio in validating the signal during a partial inspection. The signal parameters included in the stored set can vary depending on the signal type. For instance, for a voice signal, the radio 140 might remember the type of signal. It might also remember whether the signal is sourced by a repeater or another radio. For a data signal, the radio 140 could likewise remember the type of signal and whether the signal is sourced by a repeater or another radio. However, additional information such as data type, color code, and addressing at the beginning of a data message can be stored for data signals and used to validate the data signal during the partial inspection.

After marking the channel, the radio 140 leaves (212) a high priority channel for a period of time that is determined based on the location of the detected SYNC and an expected location of a subsequent SYNC on the high priority channel.

For example, the radio 140 leaves the high priority channel managed by the repeater 136 to monitor a lower priority channel managed by the repeater 114. In one embodiment, the radio sets a timer to determine a minimum amount of time to remain on the lower priority channel before returning to the higher priority channel. However, in accordance with the teachings herein, the radio also determines (212) an expected location of a subsequent SYNC on the higher priority channel relative to the location of the SYNC detected during the long inspection so that, upon expiration of the timer, the radio can coordinate the timing of the partial inspection on the higher priority channel with the expected location of the subsequent SYNC. Such coordination is done so that the radio samples in the correct slot and at an optimum location to minimize the time that it spends away from the lower priority channel (and thereby the audio hole on the lower priority channel) while waiting for SYNC to appear on the higher priority channel to perform the partial inspection. Also, a timer was mentioned in this illustrative embodiment, but it should be realized that the use of a timer in this manner is not required since, for instance, timing could be determined by bit counting, burst counting, or superframe counting.

For example, where the SYNCs are transmitted at known periodic times (or at a known periodicity), the radio coordinates the performance of the partial inspection with some multiple of the known period of the SYNC as measured from the stored SYNC location. In a DMR system, for instance, a SYNC is transmitted once every 360 ms in every DMR voice superframe (which comprises six successive bursts), with the initial timing of the SYNC being based on the start of a call, e.g., the pressing of a Push-to-talk (PTT) button on the transmitting radio. Therefore, if the type of signal was identified and remembered as a voice signal, radio 140 would coordinate leaving the lower priority channel to perform the partial inspection on the higher priority channel at a multiple (e.g., 1×, 2×, 3×, etc.) of 360 ms from the location of the SYNC signal detected during the long inspection. Alternatively, a SYNC is transmitted once every 60 ms in a data signal. So, if the type of signal was identified and remembered as a data signal, radio 140 would coordinate leaving the lower priority channel to perform the partial inspection on the higher priority channel at a multiple (e.g., 1×, 2×, 3×, etc.) of 60 ms from the location of the SYNC signal detected during the long inspection.

Based on the expected location of the subsequent SYNC, the radio 140 returns (214) to the higher priority channel 136 to perform the partial inspection, which is of a shorter duration than the full inspection. At a minimum, the partial inspection includes detecting a signal and detecting (216) whether a SYNC is at the expected location. The radio may further identify appropriate parameters during the partial inspection to compare to the parameters stored during the long inspection to determine if these parameters match. If the SYNC is in the expected location and the parameters match, the radio assumes that this signal is the same signal or is part of the same call that was detected during the long inspection. Thus, the presence of the SYNC where it was expected and the matching parameters indicates that the signal or call continues to be not of interest.

The assumptions that can be made from whether or not a SYNC is detected in the expected location during the partial inspection of a channel are based on a number of premises. First, for a data call or a repeater that is transmitting idle messages, the DMR standard specifies that a data SYNC is contained in every burst. Thus, the radio can easily determine an expected location of a subsequent data SYNC upon detecting a data signal and identifying a data SYNC during the long inspection. If the SYNC is not where it is expected during the partial inspection, it can be safely assumed that the data signal that was present during the long inspection is no longer being transmitted on the channel. Similarly for voice signals, the DMR standard specifies that a voice SYNC appears once every six bursts (at the beginning of the DMR voice superframe), which makes it easy for the radio to determine an expected location of a subsequent SYNC. Further, when a new voice call begins, the positioning of the voice SYNC (start of DMR voice superframe) is random (a function of when the user presses PTT button). This is why the SYNC location being in the expected location implies the same call, but the SYNC location changing (or a change in type of signal) implies a different call.

Accordingly, the radio maintains the channel marking; leaves (212) the higher priority channel; and monitors the lower priority channel for an amount of time based on a determined expected location of yet a subsequent SYNC. In maintaining the channel marking, the radio retains the set of parameters that it has saved for the call and maintains a SYNC location (typically the present detected SYNC location) for determining an expected location of a subsequent SYNC during the next partial inspection. The radio can continue to perform steps 212, 214, and 216 as long as a subsequent SYNC is found in the expected location and detected parameters match stored parameters or until the radio has performed steps 212, 214, and 216 a maximum allowable number of times. In that case, the radio clears (218) the channel marking and performs another long inspection on the higher priority channel. Clearing the channel marking includes forgetting or erasing the remembered SYNC location and all of the stored parameters.

In accordance with the teachings herein, a partial inspection can be performed in 60 ms (equivalent to one burst) many times, which is a significantly shorter time than the long inspection. However, the length of the partial inspection may vary depending, for instance, on the hardware capabilities of the radio and relative timing between the two channels being monitored.

In a further embodiment, the data transmission can include information about the Blocks to Follow. Data signals in DMR systems can contain Blocks to Follow information, for instance. In this embodiment, the radio withholds the partial inspection until at least all the Blocks to Follow information has been transmitted. Because the radio knows that the signal identified during the full inspection will not terminate for the duration of the blocks to follow, and those blocks are not of interest, there is no need for a partial inspection (and the associated audio holes) during that period.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for channel inspection in a communication system, the method comprising:
   conducting a full inspection on a first channel carrying a first signal, the full inspection comprising,
      determining a location of a first synchronization message; and
      determining whether the first signal is of interest;
   upon determining that the first signal is not of interest, marking the first channel to cause a partial inspection to be conducted on the first channel upon next returning to the first channel, wherein the marking includes remembering the location of the first synchronization message;
   leaving the first channel and determining an expected location of a second synchronization message on the first channel based on the location of the first synchronization message;
   returning to the first channel, and conducting a partial inspection on the first channel carrying a second signal, the partial inspection comprising,
      detecting whether the second synchronization message is present at the expected location, wherein the presence of the second synchronization message indicates that the second signal is not of interest.

2. The method of claim 1, wherein the presence of the second synchronization message further indicates that the first and second signals both comprise the same call.

3. The method of claim 1, wherein:
the full inspection further comprises identifying a first set of parameters from the first signal;
the marking further comprises remembering the first set of parameters; and
the partial inspection further comprises identifying a second set of parameters from the second signal, and comparing the second set of parameters to the first set of parameters, wherein a match between the first and second sets of parameters further indicates that the second signal is not of interest.

4. The method of claim 3, wherein the first and second sets of parameters each comprise at least one of:
a type of signal;
a source device type;
a system identification; or
a data type.

5. The method of claim 4, wherein the first set of parameters includes the type of signal, when the first signal comprises voice or data.

6. The method of claim 5, wherein the first set of parameters further includes the system identification and the data type, when the first signal comprises data.

7. The method of claim 1, wherein each synchronization message is transmitted at known periodicity, and the partial inspection is conducted at a multiple of the known periodicity.

8. The method of claim 7, wherein the partial inspection is conducted at a multiple of 360 milliseconds from the location of the first synchronization message, when the first signal comprises voice.

9. The method of claim 7, wherein the partial inspection is conducted at a multiple of multiple of 60 milliseconds from the location of the first synchronization message, when the first signal comprises non-voice.

10. The method of claim 1, wherein the partial inspection is delayed until after a duration of Blocks to Follow information, when the first signal comprises the Blocks to Follow information.

11. The method of claim 1 further comprising monitoring a second channel after leaving the first channel, wherein the first channel has a higher priority than the second channel.

12. The method of claim 1, wherein the first channel is a Time Division Multiplexing Access (TDMA) channel.

13. The method of claim 1 further comprising:
clearing the marking on the first channel when the second synchronization message is not present at the expected location; and
conducting another full inspection on the first channel.

* * * * *

UNITED STATES PATENT AND TRADEMARK OFFICE
CERTIFICATE OF CORRECTION

PATENT NO.        : 8,139,613 B2
APPLICATION NO.   : 12/253380
DATED             : March 20, 2012
INVENTOR(S)       : Belmonte et al.

It is certified that error appears in the above-identified patent and that said Letters Patent is hereby corrected as shown below:

In Column 4, Line 60, delete ""talkaraound" and insert -- "talkaround --, therefor.

In Column 12, Line 10, in Claim 9, delete "multiple of multiple of" and insert -- multiple of --, therefor.

Signed and Sealed this
Twenty-fifth Day of December, 2012

David J. Kappos
*Director of the United States Patent and Trademark Office*